Figure 1:
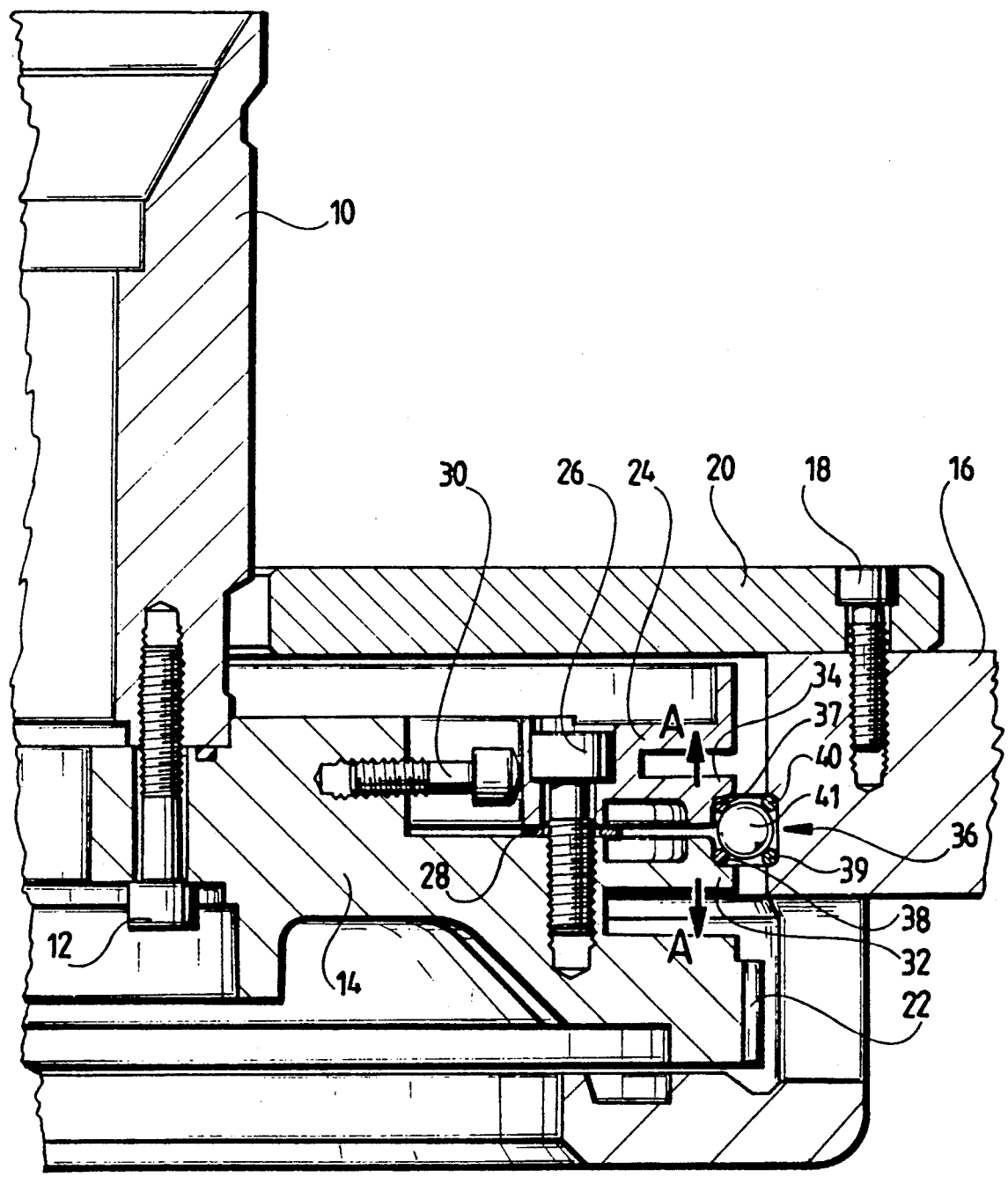

United States Patent [19]

Engelfried et al.

[11] Patent Number: 5,031,421
[45] Date of Patent: Jul. 16, 1991

[54] CIRCULAR KNITTING MACHINE

[75] Inventors: Werner Engelfried, Sindelfingen; Gerhard Müller, Esslingen, both of Fed. Rep. of Germany

[73] Assignee: Terrot Strickmaschinen GmbH, Stuttgart, Fed. Rep. of Germany

[21] Appl. No.: 480,644

[22] Filed: Feb. 14, 1990

[30] Foreign Application Priority Data

Mar. 3, 1989 [DE] Fed. Rep. of Germany ....... 3906773

[51] Int. Cl.⁵ .......................... D04B 9/00; D04B 35/00
[52] U.S. Cl. .......................................... 66/8; 384/493; 384/605; 384/611; 384/615
[58] Field of Search ...................... 66/8; 384/493, 605, 384/611, 615

[56] References Cited

U.S. PATENT DOCUMENTS

| 882,061 | 3/1908 | Greiner | 384/611 |
|---|---|---|---|
| 3,640,591 | 2/1972 | Eklund | 384/493 X |
| 3,674,357 | 7/1972 | Ladin et al. | 384/615 |
| 4,489,573 | 12/1984 | Engelfried et al. | 66/8 |
| 4,696,586 | 9/1987 | Krug | 384/611 X |
| 4,797,008 | 1/1989 | Helbig et al. | 384/615 X |

FOREIGN PATENT DOCUMENTS

| 2829678 | 1/1980 | Fed. Rep. of Germany . |
| 8419042 | 8/1984 | Fed. Rep. of Germany . |
| 3741774 | 6/1989 | Fed. Rep. of Germany ...... 384/615 |
| 216490 | 12/1984 | German Democratic Rep. ...... 66/8 |

Primary Examiner—Wm. Carter Reynolds
Attorney, Agent, or Firm—Shenier & O'Connor

[57] ABSTRACT

A circular knitting machine has a needle cylinder, a supporting disk attached to the needle cylinder coaxially therewith, a bearing body for the supporting disk surrounding the supporting disk, four bearing tracks arranged opposite one another in pairs on the supporting disk and on the bearing body, and bearing balls supported on the bearing tracks. Two elastic supporting flanges, each having one bearing track of two axially adjacent bearing tracks formed thereon, are provided to compensate radial expansions.

9 Claims, 3 Drawing Sheets

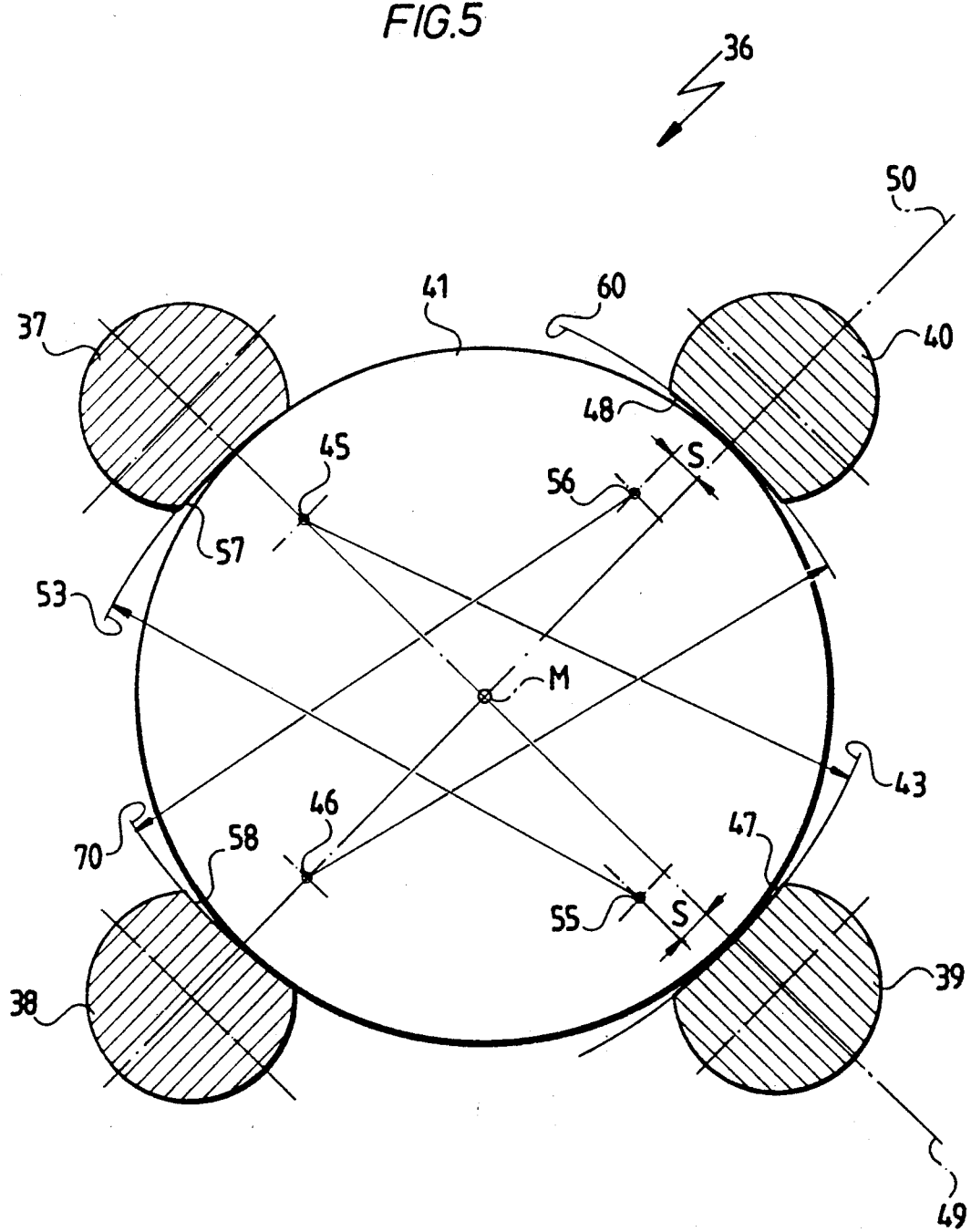

CIRCULAR KNITTING MACHINE

The invention relates to a circular knitting machine with a needle cylinder, with a supporting disk attached to the needle cylinder coaxially therewith, with a bearing body for the supporting disk surrounding the supporting disk, with four bearing tracks arranged opposite one another in pairs on the supporting disk and on the bearing body and with bearing balls supported on the bearing tracks, with some of the bearing tracks being arranged on a flange capable of deflecting elastically in order to compensate radial expansions.

A circular knitting machine of this kind is known from German patent 2 829 678. In this machine, the elastic deformation paths which occur in the deflecting flanges carrying the bearing tracks in connection with the necessary bearing pretension and unavoidable manufacturing tolerances are often undesirably large and relatively loud running noises develop during operation of the circular knitting machine.

The object of the invention is to eliminate these deficiencies and to improve a generic circular knitting machine such that only relatively small bearing pretensions are required, even comparatively large manufacturing tolerances do not have a disturbing effect and yet smooth, essentially noiseless running is ensured.

This object is accomplished in accordance with the invention in a generic circular knitting machine by providing two elastic flanges on each of which one track of two axially adjacent tracks is formed.

Figure 2:
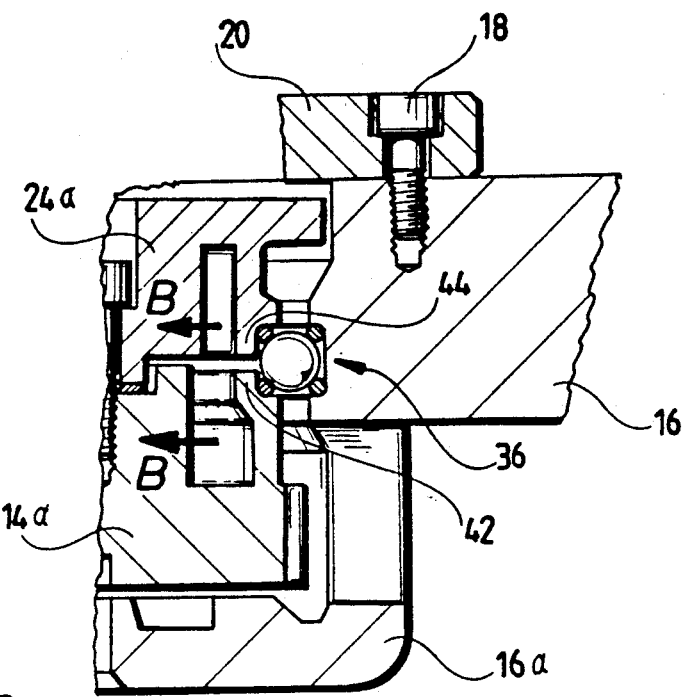
Figure 3:
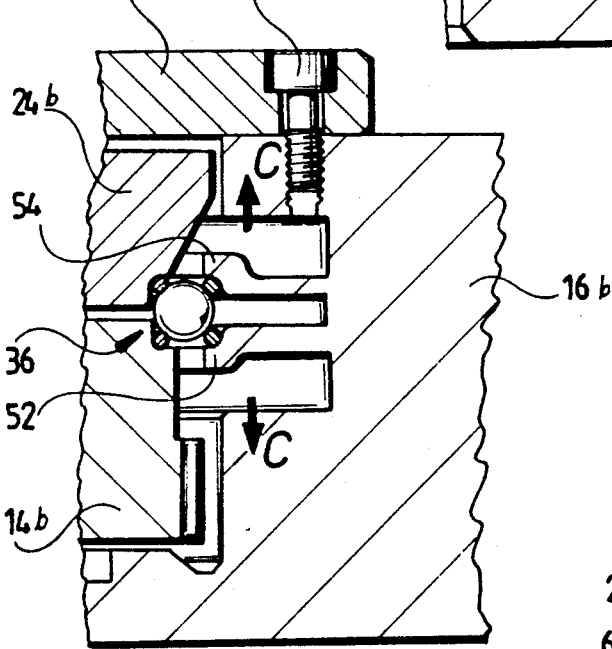
Figure 4:
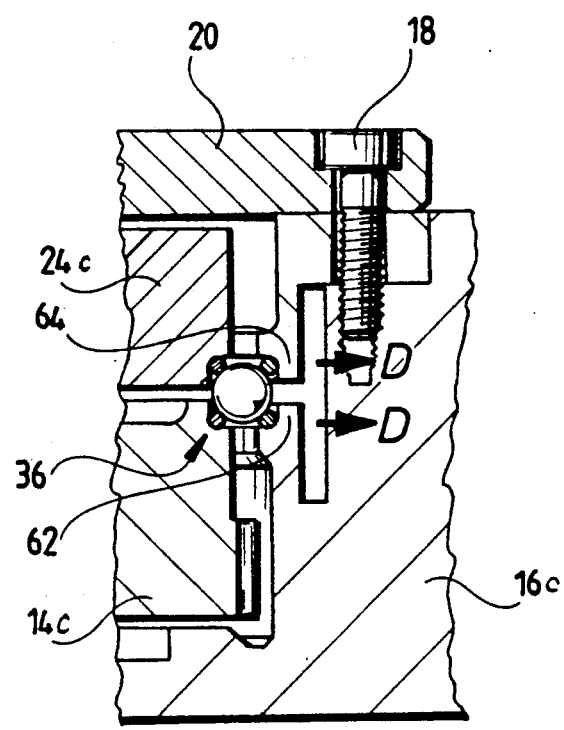

The following description of preferred embodiments serves in conjunction with the appended drawings to explain the invention in further detail. The drawings show:

FIG. 1: an axial, partial section of a circular knitting machine;

FIGS. 2 to 4: partial sections similar to FIG. 1 of other embodiments of circular knitting machines; and FIG. 5: a schematic cross-section of a ball bearing with wire rings.

FIG. 1 shows part of a circular knitting machine with a needle cylinder 10 which is fixedly connected by screws 12 or in some other way to a likewise cylindrical supporting disk 14. A ring-shaped bearing body 16 encloses the circumference of the supporting disk 14 and engages the latter partly from below. A ring plate 20 carrying in a manner known per se, not illustrated, a cam ring surrounding the needle cylinder 10 is attached to the bearing body 16 by screws 18. The supporting disk 14 and hence the needle cylinder 10 can be made to rotate via a toothing 22 on the circumference of the supporting disk 14 and a pinion, not illustrated, in a manner known per se relative to the stationary bearing body 16.

A clamping ring 24 is provided on the supporting disk 14 for attachment by screws 26 to the body of the supporting disk 14 with washers 28 interposed therebetween. The clamping ring 24 is positionable by centering screws 30 distributed over the circumference of the supporting disk 14 so that it lies concentric with the axis of the needle cylinder 10. Other centering means may also be used instead of the centering screws 30.

Elastic supporting flanges 32 and 34 are formed on the supporting disk 14 and on the clamping ring 24 constituting a component of this supporting disk 14. These protrude in a ring-like or collar-like manner from the supporting disk 14 and the clamping ring 24, respectively, and are axially opposed without touching. The supporting disk 14 and the clamping ring 24 are made in the usual manner of metal. The elasticity of the supporting flanges 32, 34 is created by the latter being connected to the supporting disk 14 and the clamping ring 24, respectively, by relatively thin web regions, as shown in the drawings. Both supporting flanges can deflect elastically in the direction of the arrows A. A ball bearing 36 comprising wire rings is supported between the supporting flanges 32, 34 and the bearing body 16. The ball bearing 36 consists of four wire rings 37, 38, 39 and 40 closed except for a narrow gap at the joint and of a set of bearing balls 41 which, confined in cage elements, not illustrated, roll on the wire rings 37 to 40. The wire rings 37, 38 are held in grooves of the supporting flanges 34 and 32, respectively, the wire rings 39, 40 in a groove on the inside circumferential wall of the bearing body 16. When a bearing pretension is imparted to the ball bearing 36 comprising the wire rings by tightening the screws 26, the supporting flanges 32, 34 undergo deformation to some extent in the direction of arrows A, with the elastic paths of deformation being distributed over both of the supporting flanges.

During operation of the circular knitting machine, above all the rapid motions of the knitting tools, for example, knitting needles, not illustrated, which are held and guided in longitudinal grooves, not illustrated, on the circumference of the needle cylinder 10, cause rapid warming up of the needle cylinder 10 and the supporting disk 14, with the result that the latter expands radially to a greater degree than the bearing body 16 which is thermally insulated to this extent. However, the supporting flanges 32, 34 can deflect in the direction of the arrows A, whereby the spacing of the wire rings 37, 38 is increased and these rings can move radially outwardly on the bearing balls 41. The radial expansion of the supporting disk 14 caused by the thermal conditions is thereby compensated.

It is not absolutely necessary for a ball bearing 36 comprising wire rings to be used in the assembly described above. In principle, the wire rings 37 to 40 may be dispensed with if appropriate bearing tracks are, for example, directly formed on the supporting flange 32, the supporting flange 34 and the bearing body 16. In this case, too, the supporting flanges 32, 34 can deflect in the direction of the arrows A upon generation of the desired bearing pretension and radial expansion of the supporting disk 14 owing to the thermal conditions and displace the bearing tracks to some extent relative to the bearing balls 41.

It was found that with the above-described use of two elastic supporting flanges 32, 34 in contrast with the known single supporting flange, greater manufacturing tolerances can be accepted, in particular on the supporting disk 14, the bearing body 16 and the clamping ring 24 because corresponding elastic deformation paths are distributed over the two supporting flanges 32, 34.

The halved deformation path of the elastic supporting flanges 32, 34 also causes half of the force to be exerted on the bearing tracks and on the balls, which increases the service life of the assembly. A circular knitting machine of such design has also proven to have particularly smooth running characteristics. The elastic supporting flanges 32, 34 which are subjected to relatively little bearing pretension hug the wire rings 37, 38 uniformly. Owing to this hugging, the balls roll over the joint of the wire rings less noisily. The cage elements associated with the balls 41 were also found to eliminate the mutual running up against one another, which likewise has a favorable effect on the quiet running.

The supporting discs in FIGS. 1 to 4 are designated respectively as 14, 14a, 14b and 14c, the bearing bodies in the respective Figures are designated by the respective reference characters 16, 16a, 16b and 16c, while the clamping rings are designated by reference characters 24, 24a, 24b and 24c.

In the embodiment according to FIG. 1, the two elastic supporting flanges 32, 34 extend generally radially. The embodiment according to FIG. 2 differs therefrom only in that the corresponding elastic supporting flanges 42 and 44 formed on the supporting disk 14a and the clamping ring 24a, respectively, do not extend radially but generally axially. Apart from that, the assembly according to FIG. 2 exhibits the same characteristics as explained in conjunction with FIG. 1.

While in the embodiments according to FIGS. 1 and 2, the elastic supporting flanges 32, 34 and 42, 44 are formed on the supporting disk 14 or 14a and on the clamping ring 24 or 24a fixedly connected to the latter, FIGS. 3 and 4 show corresponding embodiments in which the elastic supporting flanges are formed on the outer bearing body 16b or 16c. In the embodiment according to FIG. 3, the elastic supporting flanges 52, 54 extend generally radially; in the embodiment according to FIG. 4, the supporting flanges 62, 64 extend generally axially. Apart from that, the embodiments according to FIGS. 3 and 4 also have the same characteristics as described above in conjunction with the embodiments according to FIGS. 1 and 2. In the case of FIG. 2, the supporting flanges 42, 44 are elastically deformable in the direction of the arrows B; the same applies to the assemblies according to FIGS. 3 and 4 with respect to arrows C and D.

If a separate clamping ring 24 is not provided on the supporting disk 14, both supporting flanges 32, 34 or 42, 44 are, of course, integrally formed on the supporting disk 14 itself, as shown in FIGS. 3, 4 in the case of the (integral) bearing body 16 with the supporting flanges 52, 54 and 62, 64. In this case, however, the bearing body 16 would, for assembly reasons, have to be of two-part design.

In FIG. 5, the ball bearing 36 comprising the wire rings is shown again schematically and on a substantially larger scale. As shown in the Figure, the actual bearing tracks of the bearing ball 41 are ground hollow, in particular with a circular profile, in the facing flanks of the wire rings 37, 38, 39 and 40. The circular arcs 43, 60 determining the hollow profile of the wire rings 39, 40 have a radius which is larger than the radius of the bearing ball 41. The centers of the circular arcs 43, 60 are indicated by reference numerals 45 and 46, respectively, in FIG. 5. In this way, linear contact of the bearing ball 41 with the bearing tracks 47, 48 ground into the wire rings 39 and 40, respectively, is ensured, which, in turn, advantageously affects the running characteristics, in particular the quiet running of the assembly. The centers 45, 46 of the circular arcs 43 and 60, respectively, lie on a diameter of the bearing ball 41, the extensions of which pass through the center of the circular cross-sectional areas of the adjacent wire rings 37, 39 and 38, 40, respectively. Hence the hollow-ground bearing tracks 47, 48 lie symmetrically in relation to lines formed by these diameters and their extensions. These lines are indicated by reference numerals 49 and 50, respectively, in FIG. 5.

The bearing tracks on the wire rings 37, 38 are ground hollow with approximately the same radius as in the wire rings 39, 40, but the centers 55, 56 of the circular arcs 53, 70 determining this hollow-ground profile do not lie on the lines 49, 50 determined by the above-mentioned diameters and their extensions but are offset laterally therefrom, as indicated by the letter S in FIG. 5. Hence the tracks 57 and 58 of the wire rings 37 and 38, respectively, are ground eccentrically with respect to the center of the bearing ball 41 and not concentrically, as in the case of the wire rings 39, 40. The resulting asymmetrical position of the circular arcs 53, 70 in comparison with the symmetrically arranged circular arcs 43, 60 is clearly apparent from FIG. 5. What is achieved by these eccentrically ground bearing tracks 57, 58 is that upon deflection of the elastic supporting flanges 32, 34 (FIG. 1) carrying the wire rings 37, 38 and the resulting displacement of the wire rings 37, 38 relative to the bearing ball 41, this bearing ball does not run on an edge of the wire rings, this edge being the edge of intersection of the hollow-ground track 57, 58 and the outer circumferential surface of the wire rings 37, 38.

The eccentrically ground tracks 57, 58 are preferably formed only on those wire rings 37, 38 which are carried by the elastic supporting flanges 32, 34 or 42, 44 or 52, 54 or 62, 64. On the opposite, rigid wire rings, e.g., 39, 40, held on the bearing body 16 or on the supporting disk 14, respectively, the concentrically or symmetrically ground bearing tracks 47, 48 are adequate.

In a concrete embodiment, the bearing balls 41 may, for example, have a diameter of approximately 13 mm and the wire rings 37 to 40 a diameter of approximately 4 mm, while the diameter of the circular arcs 43, 60, 53, 70 determining the hollow-ground profile on these wire rings may be approximately 20 mm.

In particular, use of the double bearing flange described above—e.g., 32, 34—also causes the needle cylinder 10 to essentially remain in its specified zero position in the vertical direction during the warming up and hence the knocking-over edge responsible for the stitch size essentially maintains its position. This is due to the fact that owing to the elastic deflecting motions of the two supporting flanges, e.g., 32, 34, the needle cylinder is not lifted in the upward direction and does also not alter its centering.

What is claimed is:

1. A circular knitting machine comprising a needle cylinder, a supporting disk attached to said needle cylinder coaxially therewith, a bearing body for said supporting disk surrounding said supporting disk, four bearing tracks arranged opposite one another in pairs on said supporting disk and on said bearing body, and bearing balls supported on said bearing tracks, one pair of said bearing tracks being arranged on a pair of supporting flanges capable of deflecting elastically in order to compensate radial expansions said supporting flanges carrying wire rings having circular cross-sectional areas and said bearing tracks being ground hollow into all of these wire rings with a circular profile defined by a circular arc and with a radius larger than the radius of said bearing balls, said bearing tracks on said wire rings carried by said elastically deflecting supporting flanges being eccentrically ground with respect to the center of said bearing balls, the center of said circular arc defining said hollow-ground circular profile being offset laterally by a certain distance (S) from the diameter of said bearing balls, the extension of which diameter passes through the center of said circular cross-sectional area of the adjacent wire rings, such that upon deflection of said elastically deflecting supporting flanges, said bearing balls do not run on edges of said hollow-ground wire rings.

2. Circular knitting machine as defined in claim 1, characterized in that both of said elastically deflecting supporting flanges (32, 34; 52, 54) extend in a generally radial direction.

3. Circular knitting machine as defined in claim 1, characterized in that both of said elastically deflecting supporting flanges (42, 44; 62, 64) extend in a generally axial direction.

4. Circular knitting machine as defined in claim 2, characterized in that both of said elastically deflecting supporting flanges (32, 34; 42, 44) protrude from said supporting disk (14).

5. Circular knitting machine as defined in claim 3, characterized in that both of said elastically deflecting supporting flanges (32, 34; 42, 44) protrude from said supporting disk (14).

6. Circular knitting machine as defined in claim 2 characterized in that one elastically deflecting supporting flange (32; 42) protrudes from said supporting disk (14) and one elastically deflecting supporting flange (34; 44) from a clamping ring (24) connected to said supporting disk.

7. Circular knitting machine as defined in claim 3, characterized in that one elastically deflecting supporting flange (32; 42) protrudes from said supporting disk (14) and one supporting flange (34; 44) from a clamping ring (24) connected to said supporting disk.

8. Circular knitting machine as defined in claim 2, characterized in that both of said elastically deflecting supporting flanges (52, 54; 62, 64) protrude from said bearing body (16).

9. Circular knitting machine as defined in claim 3, characterized in that both of said elastically deflecting supporting flanges (52, 54; 62, 64) protrude from said bearing body (16).

* * * * *

UNITED STATES PATENT AND TRADEMARK OFFICE
CERTIFICATE OF CORRECTION

PATENT NO. : 5,031,421

DATED : July 16, 1991

INVENTOR(S) : Werner Engelfried and Gerhard Muller

It is certified that error appears in the above-identified patent and that said Letters Patent is hereby corrected as shown below:

Column 6, line 12 - after "one" insert

-- elastically deflecting --.

Signed and Sealed this

First Day of December, 1992

Attest:

DOUGLAS B. COMER

*Attesting Officer*   *Acting Commissioner of Patents and Trademarks*